March 7, 1967 C. M. WRIGHT 3,308,384
ONE-OUT-OF-n STORAGE CIRCUIT EMPLOYING AT LEAST 2n GATES FOR n INPUT SIGNALS
Filed Aug. 31, 1964 4 Sheets-Sheet 1
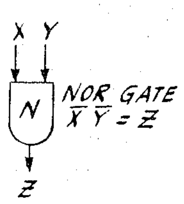
Fig. 1a.
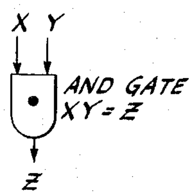
Fig. 1b.
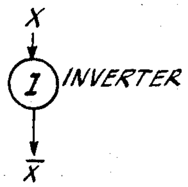
Fig. 1c.
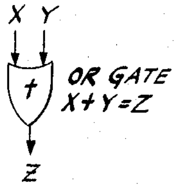
Fig. 1d.
| X | Y | AND Z | NOR Z | OR Z |
|---|---|---|---|---|
| 0 | 0 | 0 | 1 | 0 |
| 0 | 1 | 0 | 0 | 1 |
| 1 | 0 | 0 | 0 | 1 |
| 1 | 1 | 1 | 0 | 1 |
Fig. 1e.
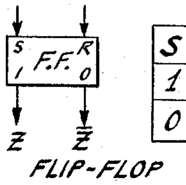
| S | R | Z | $\bar{Z}$ |
|---|---|---|---|
| 1 | 0 | 1 | 0 |
| 0 | 1 | 0 | 1 |
Fig. 1f.
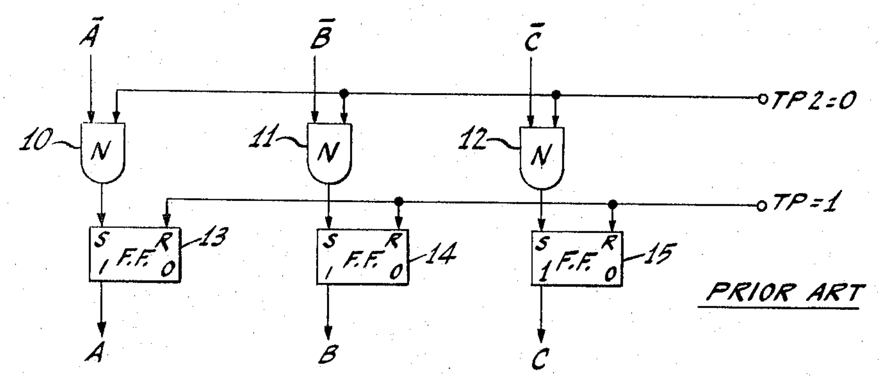
PRIOR ART
Fig. 2.
INVENTOR.
CARL M. WRIGHT
BY Samuel Cohen
Attorney INVENTOR.
CARL M. WRIGHT
BY
Samuel Cohen
Attorney INVENTOR.
CARL M. WRIGHT
BY
Samuel Cole
Attorney INVENTOR.
CARL M. WRIGHT
BY
Samuel Cohen
Attorney United States Patent Office 3,308,384

Patented Mar. 7, 1967

3,308,384
ONE-OUT-OF-n STORAGE CIRCUIT EMPLOYING AT LEAST 2n GATES FOR n INPUT SIGNALS

Carl M. Wright, Falls Church, Va., assignor to Radio Corporation of America, a corporation of Delaware Filed Aug. 31, 1964, Ser. No. 393,133
7 Claims. (Cl. 328—51)

This invention relates to new and improved 1-out-of-$n$ storage circuits, ring counters and the like.

The circuits of the invention include $n$ pairs of gates, $n$ being an integer, each pair comprising a first gate and a second gate. Each first gate receives a different one of $n$ input signals, one of the $n$ signals representing a bit of one value and the remaining $n-1$ input signals representing the bit of other value. The bit of one value is applied in a sense to enable the gate receiving this bit, and the bits of other value are applied in a sense to disable the gates receiving these bits. A timing signal is applied to all first gates for enabling the gate receiving the input signal indicative of the bit of one value. The logical sum of the outputs of each pair of gates is applied to the second gates of all other pairs of gates in a sense to enable the second gate associated with the enabled first gate and in a sense to disable the remaining $n-1$ second gate.

A feature of the present circuit is its use of relatively few components and accordingly its relatively simple and inexpensive construction. Other features of the circuit are the use of only one group of timing signals and the requirement that the source of timing signals drive only a relatively modest load.

The invention is discussed in greater detail below and is shown in the following drawings, of which:

FIGURES 1*a*–1*f* illustrate the conventions employed in the remaining figures;

FIGURES 2 and 3 illustrate two prior art 1-out-of-$n$ storage circuits where $n=3$;

Figure 3:
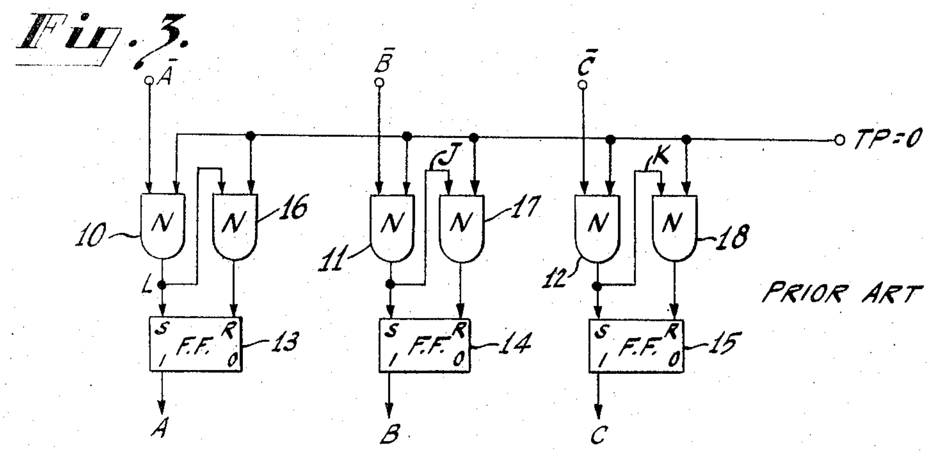

The circuits of the invention employ logic gates such as the NOR and AND gates shown in FIGURES 1*a* and 1*b*, respectively. The Boolean equations of these figures and the truth table of FIGURE 1*e* describe the operation of these gates. The gates receive electrical signals indicative of binary digits (bits) and produce output electrical signals indicative of bits. When a signal is at one level, it represents a bit of one value and, when it is at a second level, it represents a bit of the other value. It may be assumed arbitrarily that a high level signal represents the bit 1 and a low level signal, the bit 0. To simplify the discussion which follows, rather than referring to the signals which manifest bits, the bits themselves are often referred to.

A prior art 1-out-of-3 storage circuit, FIGURE 2, includes three NOR gates 10, 11 and 12 and three flip-flops 13, 14 and 15. In the operation of this circuit, an input control or timing pulse $TP1=1$ is initially applied to the reset terminals (R) of the flip-flops for resetting all flip-flops. Then a second timing pulse $TP2=0$ is applied concurrently with the input word $\overline{ABC}$. The word in question comprises a 1-out-of-$n$ code. For example, assume ABC is 100, so that $\overline{ABC}$ equals 011. Then, upon the concurrent application of the TP2 signal and the input word, NOR gate 10 becomes enabled and its output sets flip-flop 13, whereas NOR gates 11 and 12 remain disabled, since $\overline{B}=1$ and $\overline{C}=1$, so flip-flops 14 and 15 remain reset. Therefore the word $\overline{ABC}$ stored is 100.

The circuit of FIGURE 2 employs three NOR gates and three flip-flops. In one particular circuit which is in use, each flip-flop comprises two cross-coupled NOR gates. Accordingly, the circuit of FIGURE 2 requires a total of nine NOR gates.

A disadvantage of the circuit of FIGURE 2, in some applications, is the requirement for two sets of non-coincident timing pulses, the first for resetting the flip-flop and the second for priming the input gates. By adding a second input gate to each stage, this disadvantage is avoided at the cost, however, of additional equipment. Further, the timing pulse source (not shown) must now concurrently drive six gates, rather than three. In the general case, if $n$ is the number of input bits, the timing pulse source must concurrently drive $2n$ gates in the circuit of FIGURE 3 and only $n$ gates in the circuit of FIGURE 2.

The three additional gates discussed above are shown at 16, 17 and 18 in FIGURE 3. Each additional gate receives as one input the output of the other NOR gate associated with the flip-flop and as a second input the timing pulse $TP=0$. The operation of the circuit of FIGURE 3 can readily be traced by assuming an input word $\overline{ABC}$, such as 011. The $\overline{B}=1$ and $\overline{C}=1$ inputs disable NOR gates 11 and 12, whereby these gates apply a priming signal $J=0$ and $K=0$, respectively, to NOR gates 17 and 18. The second input to gates 17 and 18 is $TP=0$, whereby both gates become enabled and apply reset signals to their respective flip-flops 14 and 15. $\overline{A}=0$ is a priming signal for NOR gate 10. The second input to this gate $TP=0$ serves to enable the gate, whereby it produces an output $L=1$ both to the set terminal of flip-flop 13 and to one input terminal to NOR gate 16. The $L=1$ signal disables NOR gate 16, and this prevents the $TP=0$ signal from resetting the flip-flop 13. The $L=1$ signal applied to the set terminal (S) of flip-flop 13 sets the flip-flop.

Figure 4:
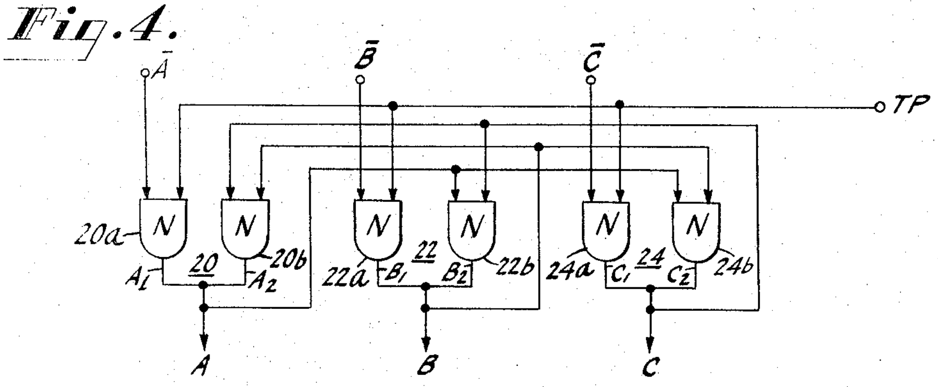
FIGURE 4 is a block circuit diagram of a 1-out-of-$n$ arrangement according to the present invention which employs NOR gates.

An improved circuit according to the present invention which employs fewer gates than the circuit of FIGURE 2 and in which only one group of timing pulses is required is shown in FIGURE 4. The timing pulse is applied to only $n$ gates, $n$ being the number of input bits, which is 3 in this example. The circuit includes $n$ (=3) pairs of NOR gates 20, 22 and 24. Each pair includes a first gate 20*a*, 22*a* and 24*a*, respectively, and a second gate 20*b*, 22*b* and 4*b*, respectively. The logical sum of the outputs of each pair of gates is applied to the second gate of the remaining pairs of gates. For example, the logical sum $A_1+A_2=A$ of the outputs of gates 20*a* and 20*b* is applied to second gates 22*b* and 24*b*. The logical sum $B_1+B_2=B$ of the outputs of the pair of gates 22 is applied to second gates 20*b* and 24*b*, and the logical sum $C_1+C_2=C$ of the pair of gates 24 is applied to the second gates 20*b* and 22*b*. The input bits $\overline{ABC}$ are applied to first gates 20*a*, 22*a* and 24*a*, respectively. The timing pulse $TP=0$ is also applied to all first gates.

The operation of the circuit of FIGURE 4 can be illustrated by assuming it is desired to store a particular input word $\overline{ABC}$, such as 101. $\overline{A}=1$ and $\overline{C}=1$ disable NOR gates 20*a* and 24*a*, respectively. $\overline{B}=0$ primes NOR gate 22*a*. The timing pulse $TP=0$ is applied concurrently with the input word. This timing pulse $TP=0$ serves as an enabling signal for gate 22*a* and produces an output $B_1=1$, so that the logical sum $B_1+B_2=B=1$. This output serves to disable NOR gates 20*b* and 24*b*. As NOR gates 24*a* and 24*b* are both disabled, their outputs are $C_1=0$ and $C_2=0$, respectively, and the logical sum of these outputs is $C=0$. This is fed back as a priming signal to NOR gate 22*b*. In a similar manner, NOR gates 20*a* and 20*b* are both disabled and the logical sum of their outputs $A=0$ is applied as an enabling signal for NOR gate 22*b*. As both inputs to NOR gate 22*b* are 0, NOR gate 22*b* becomes enabled and $B_2=1$. The word ABC stored is 010.

The input word $\overline{ABC}$ continues to be applied during the time the timing pulse TP is equal to 0. Upon the removal of all inputs, that is, when TP returns to 1 and $\overline{ABC}$ returns to 111, NOR gate 22*a* becomes disabled. However, the second gate of the pair 22, namely NOR gate 22*b*, continues to receive the enabling signals $A=0$, $C=0$, whereby NOR gate 22*b* continues to produce an output $B_2=1$. Accordingly, even though $B_1$ is now 0, B, which is equal to $B_1+B_2$, is 1. The circuit therefore continues to store the word $ABC=010$.

As previously mentioned, the circuit of FIGURE 2 employs nine NOR gates in one particular data processing machine. This circuit has as its circuit elements nine transistors, eighteen input diodes, nine load resistors and nine output clamp diodes. The circuit of FIGURE 3, implemented with the same gates as the circuit of FIGURE 2, uses twelve transistors, twenty-four input diodes, twelve load resistors and twelve output clamp diodes. This embodiment of the invention shown in FIGURE 4 employs only six transistors, twelve input diodes, three load resistors and three output clamp diodes.

If one arbitrarily assumes the cost of a resistor to be one unit, the approximate cost of the other circuit elements is four units per diode and sixteen units per transistor. Using these figures, the approximate costs of the three circuits discussed are:

FIGURE 2=261 units
FIGURE 3=348 units
FIGURE 4=159 units

In terms of percentages, the circuit of FIGURE 4 is roughly 60% of the cost of the circuit of FIGURE 2 and 45% of the cost of the circuit of FIGURE 3. In addition, the circuit of FIGURE 4 provides the performance of the circuit of FIGURE 3, but with the more modest loading on the timing pulse source of the circuit of FIGURE 2.

In the discussion of FIGURE 4, it is stated that the logical sum of the outputs of each pair of gates is applied to the second gates of the remaining pairs of gates. While one could employ an OR gate in each case to obtain the logical sum, the present circuit simulates each OR function by the direct connection of two leads—the output leads of the gates (such as 20*a* and 20*b*) of a pair.

Figure 5:
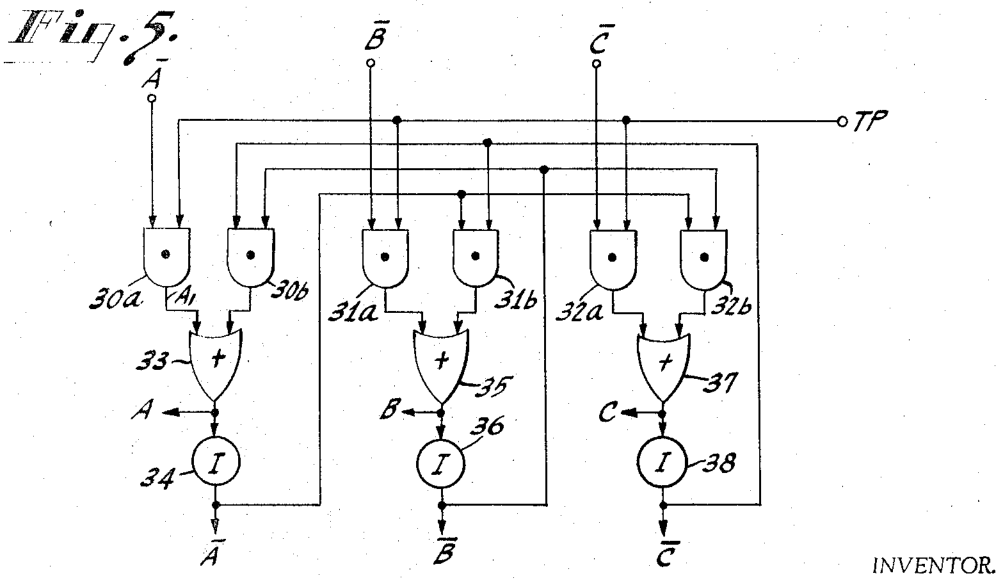
FIGURE 5 is a block circuit diagram of another form of the invention, this one employing AND gates and inverters.

A different circuit embodying the invention is illustrated in FIGURE 5. This circuit includes six AND gates 30*a*, 30*b*, 31*a*, 31*b*, 32*a* and 32*b*, three OR gates 33, 35 and 37, and three inverters 4, 6 and 8. Each inverter applies the complement of the logical sum of the outputs of a pair of gates to the second gates of the other pairs of gates.

The operation of the circuit of FIGURE 5 is quite analogous to that of the circuit of FIGURE 4. Assume the input word ABC to be 100. This primes gate 30*a* and disables gates 31*a* and 32*a*. The timing pulse $TP=1$ applied concurrently with the input word enables AND gate 30*a*, and it produces an output $A_1=1$. The inverter 34 thereby produces an output $\overline{A}=0$ which is a disabling signal for AND gates 31*b* and 32*b*. Accordingly, $B=0$ and $C=0$, whereby $\overline{B}=1$ *and* $\overline{C}=1$. The latter two bits enable AND gate 30*b* and the enabled gate stores $A=1$ after both the timing pulse TP changes back to 0 and ABC changes back to 000.

Figure 6:
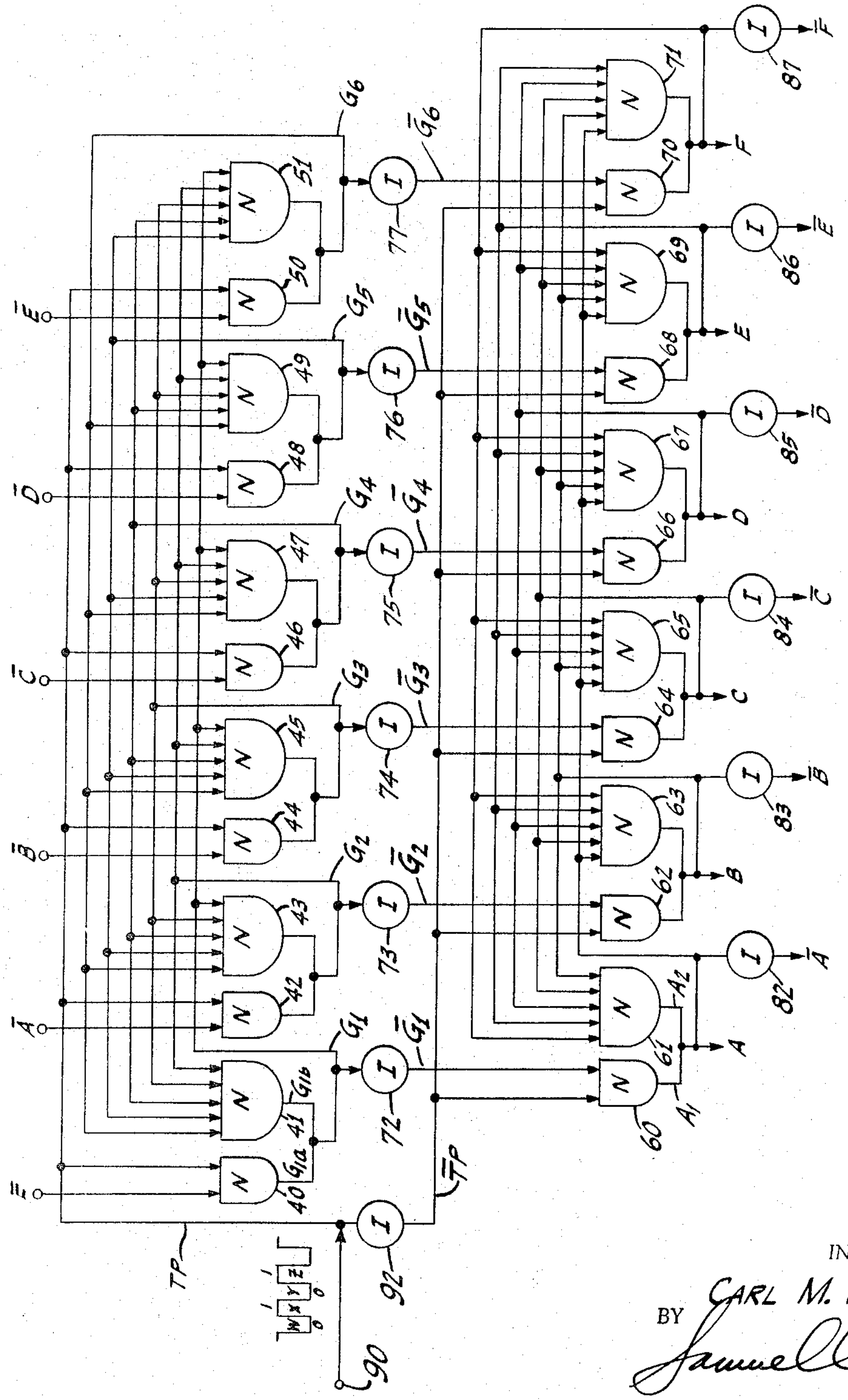
FIGURE 6 is a block circuit diagram of a ring counter according to the invention.

The ring counter of FIGURE 6 illustrates how the principles of the invention may be applied for circulating a 1-out-of-6 code. The circuit includes NOR gates 40–51 and 60–71. Inverters 72–77 are connected between each pair of NOR gates in the upper row and the first NOR gate of the corresponding pair in the lower row. The inverters 82–87 are connected to receive the logical sum of the outputs of each pair of NOR gates in the second row. The outputs of these inverters are applied back to the inputs to gates of the first row, as is discussed shortly. An input square wave train TP is applied from terminal 90 to the first gates in the upper row and the complement TP of the wave train is applied by inverter 92 to the second gates of the second row.

In the operation of the circuit of FIGURE 6, assume the word ABCDEF, which is initially stored, to be 000001. $\overline{F}$ therefore equals 0. Assume the first input pulse W to have a polarity indicative of a 0 This serves to enable NOR gate 40. The remaining first NOR gates 42, 44 ,46, 48 and 50 are disabled by $$\overline{A}=\overline{B}=\overline{C}=\overline{D}=\overline{E}=1$$

The logical sum $G_{1a}+G_{1b}=G=1$ of the outputs of NOR gates 40 and 41 serves as a disabling signal for NOR gates 43, 45, 47, 49 and 51. The outputs $G_2$, $G_3$, $G_4$, $G_5$ and $G_6$, all of which are equal to 0, serve to maintain gate 41 enabled, whereby this gate stores the output $G_{1b}=1$.

Inverter 72 applies its output $\overline{G}_1=0$ as a priming signal to NOR gate 60. When the input square wave changes its polarity, as indicated by X=1, inverter 92 applies its output $\overline{X}=0$ to NOR gates 60, 62, 64, 66, 68 and 70. NOR gate 60 thereupon produces an output $A_1=1$ so that A, which equals $A_1+A_2$ now also equals 1. $A=1$ serves to disable NOR gates 63, 65, 67, 69 and 71. Gates 62, 64, 66, 68 and 70 are also disabled as these each receive a $\overline{G}$ input equal to 1. Therefore, $A=1$ but B, C, D, E and F all equal 0, which enables the second NOR gate 61 and holds the output $A=1$. $\overline{A}$, the output of inverter 92, is now equal to 0 and it serves to prime NOR gate 42 in the upper rank.

During the third half-cycle Y of the input pulses, the polarity of the input pulse again changes ($Y=0$). This caues NOR gate 42 to become enabled, $G_2$ changes to 1, and $G_1$, $G_3$, $G_4$, $G_5$ and $G_6$ are all 0.

Summarizing the operation discussed above, the original stored pattern is ABCDEF=000001. In response to the first half-cycle of timing pulses during which $W=0$, so that $TP=0$ and $\overline{TP}=1$, the G word changes to 100000. In response to the second half-cycle X of the input timing pulse, that is, when TP changes to 1 and $\overline{TP}$ to 0, the ABCDEF word changes to 100000. In response to the third half-cycle Y of the input timing pulses, that is, when $TP=0$ and $\overline{TP}=1$, the G word changes to 010000. During the fourth half-cycle Z of the timing pulses, the ABCDEF word changes to 010000 and so on.

Figure 7:
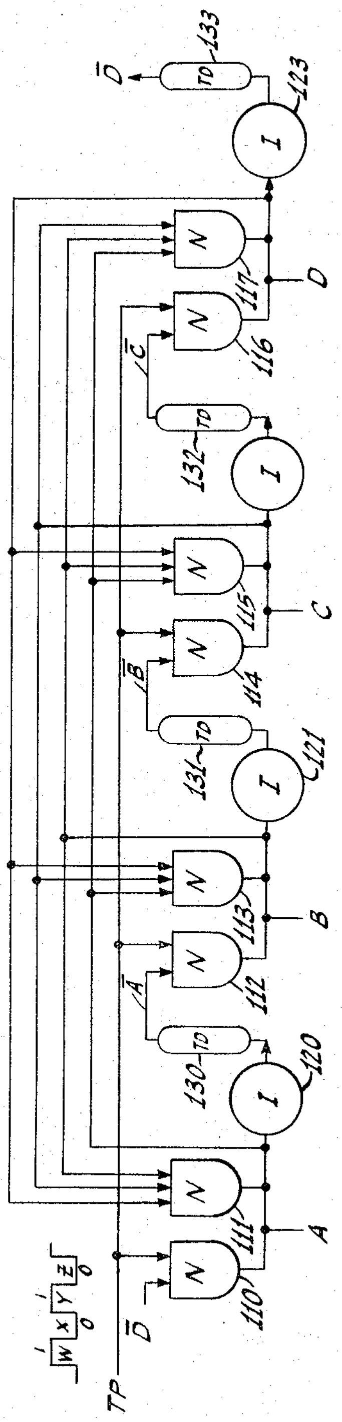
FIGURE 7 is a block circuit diagram of another form of ring counter according to the invention.

FIGURE 7 illustrates a ring counter using four pairs ($n=4$) of NOR gates. NOR gates 110, 112, 114 and 116 comprise the first gates of the pairs and NOR gates 111, 113, 115 and 117 comprise the second gates of the pairs. The logical sum of the outputs of each pair of gates is applied directly to the second gate of all other pairs of gates. The inverters 120, 121, 122 and 123, respectively, apply the complements of the logical sum of the outputs of the pair of gates to which they are connected through delay circuits (TD) 130, 131, 132 and 133, respectively, to the input to the first gate of the succeeding pair of gates. The input square wave TP is applied to the first gate of each pair of gates.

The delay circuits may be delay lines. The delay interval inserted by each such delay circuit is substantially equal to the period of one half-cycle of the input square wave TP.

The operation of the circuit of FIGURE 7 may more easily be understood by assuming an initial word stored, such as $ABCD=0001$, when the initial half-cycle W of the wave TP represents the bit 1. During the interval W, $\overline{A}$, $\overline{B}$ and $\overline{C}$ are equal to 1 and inhibit NOR gates 112, 114 and 116. The fourth bit $\overline{D}=0$ primes NOR gate 110. When the next half-cycle X occurs, $TP=0$ and the only first gate enabled is NOR gate 110 The outputs B, C and D then change their value to 0. However, $\overline{D}$ retains its value 1 for the duration of the half-cycle X because of the time delay inserted by delay circuit 133. In other words, the change in value of $\overline{D}$ from 0 to 1 does not reach NOR gate 110 until the half-cycle X terminates.

The word ABCD stored during the half-cycle X is 1000. It continues to be stored for the duration of the half-cycle X ($TP=0$) because NOR gate 110 continues to be enabled by $\overline{D}=0$. The feedback of bits $$B=C=D=0$$

enables NOR gate 111 during the half-cycle X and the bit $A=1$ inhibits NOR gates 113, 115 and 117 during this same half-cycle. NOR gate 112 is not primed by $\overline{A}=0$ during the X period because the delay circuit 130 delays the arrival of the bit $\overline{A}=0$ to NOR gate 112.

During the next half-cycle Y, TP changes to 1 and none of the first gates are enabled. However, the logical sum of the outputs of NOR gates 110 and 111 is still $A=1$, since $B=C=D=0$. Accordingly, the word $ABCD=$ 1000 continues to be stored.

During the next half-cycle Z, TP changes to 0 and NOR gate 112 becomes enabled. (By this time, $\overline{A}=0$ is applied to NOR gate 112.) The stored word is therefore changed to $ABCD=0100$, and so on. Each cycle, the 1-out-of-$n$ code is shifted one stage to the right.

In the examples of the invention given, $n$ is 3, 4, or 6. It is to be understood that $n$ can be any value such as 5, 7, 8, 9 and so on. The limiting factors in any particular circuit design include the "fan-in" and "fan-out" capabilities of the gates employed. "Fan-in" refers to the number of inputs permitted per gate and "fan-out" refers to the number of stages (such as other gates) which can be driven by a gate. In the present circuits, each gate feeds back to $n-1$ other gates and some of the gates receive up to $n-1$ inputs. It is understood that where $n$ is a large number, additional gates may be used to increase the "fan-in," capabilities of the various stages.

What is claimed is:

1. In combination, $n$ pairs of gates, each gate of the type which becomes disabled when one or more input signals to the gate is in a sense to disable the gate, each pair of gates comprising a first gate and a second gate, where $n$ is an integer;

means for applying to each first gate a different one of $n$ signals, one of said $n$ signals representing a bit of one value and being of a sense to prime the gate to which it is applied, and all other of said $n$ signals representing the bit of other value and being of a sense to disable the gates to which they are applied;

means for applying a timing signal to all first gates for enabling the one of the first gates which receives the signal indicative of said bit of one value;

means for producing $n$ signals indicative of the logical sums of the outputs of said $n$ pairs of gates, respectively; and means for applying each signal indicative of the logical sum of the outputs of each pair of gates to the second gates of all other pairs of gates, in a sense to enable the second gate associated with the enabled first gate, and in a sense to disable the remaining $n-1$ second gates.

2. In combination, $n$ pairs of gates, each gate of the type which becomes disabled when one or more input signals to the gate is in a sense to disable the gate, each pair of gates comprising a first gate and a second gate, where $n$ is an integer;

means for applying to each first gate a different one of $n$ signals, one of said $n$ signals representing a bit of one value and being of a sense to prime the first gate to which it is applied, and all other of said $n$ signals representing the bit of other value and being of a sense to disable the first gates to which they are applied;

means for applying a timing signal to all first gates for enabling the one of the first gates which receives the signal indicative of said bit of one value;

means for producing $n$ signals indicative of the logical sums of the outputs of said $n$ pairs of gates, respectively;

means for applying the signals indicative of the logical sum of the output of the one enabled first gate and the output of the particular second gate associated therewith to all remaining second gates, in a sense to disable all of said remaining second gates; and means for applying the signals indicative of the logical sums of the outputs of each pair of the remaining gates to said particular second gate in a sense to enable said particular second gate.

3. In combination, $n$ pairs of NOR gates, each pair comprising a first NOR gate and a second NOR gate, where $n$ is an integer;

means for applying to each first gate a different one of $n$ signals, one of said $n$ signals representing the bit 0 and the remaining $n-1$ of said signals representing the bit 1;

means for applying a timing signal indicative of the bit 0 to all first gates concurrently with the application of the $n$ signals to the first gates, respectively, for enabling the one of the first gates to which the signal indicative of the bit 0 is applied;

means for producing $n$ signals, each such signal representing the logical sum of the outputs of a different pair of said gates;

means for applying the signal representing the logical sum of the 1 output of the enabled first gate and the output of the particular second gate associated therewith to all other second gates for disabling the latter second gates; and means for applying signals representing the logical sums of the 0 outputs of each pair of the remaining gates to said particular second gate in a sense to enable said particular second gate.

4. In combination, $n$ pairs of AND gates, each pair comprising a first AND gate and a second AND gate, where $n$ is an integer;

means for applying to each first gate a different one of $n$ signals, one of said $n$ signals representing the bit 1 and the remaining $n-1$ of said signals representing the bit 0;

means for applying a timing signal indicative of the bit 1 to all first gates concurrently with the application of the $n$ signals to the first gates, respectively, for enabling the one of the first gates to which the signal indicative of the bit 1 is applied;

means for producing $n$ signals, each representing the complement of the logical sum of the outputs of a different pair of said gates;

means for applying the signal indicative of the complement of the logical sum of the 1 output of the enabled first gate for the output of the particular second gate associated therewith to all other second gates second gates for disabling the latter second gates; and means for applying the signals indicative of the complements of the logical sums of the 0 outputs of each pair of the remaining gates to said particular second AND gate for enabling said particular second gate.

5. A ring counter comprising in combination, $2n$ pairs of gates, $n$ gates in a first group and $n$ gates in a second group, each pair of said gates comprising a first gate and a second gate, where $n$ is an integer;

means for applying to each first gate in the first group a different one of $n$ signals, one of said $n$ signals representing a bit of one value and being of a sense to prime the gate to which it is applied, and all other of said $n$ signals representing the bit of other value and being of a sense to disable the gates to which they are applied;

means for applying the logical sums of the outputs of the gates in the first group to the corresponding first gates, respectively, in the second group, in a sense to enable the first gate of the second group corresponding to the primed gate of the first group and to disable the remaining first gates of the second group;

means for applying the logical sum of the output of each $i$'th pair of gates in the second group, to the first gate of $(i+1)$'th pair of gates in the first group, in a sense to enable one first gate in the first group and to disable all remaining first gates in the first group;

means for applying a timing signal to all first gates of the first group for enabling the one of the first gates which receives the signal indicative of said bit of one value during one half-cycle and for disabling all first gates of the first group during the next half-cycle;

means for applying the complement of said timing signal to all first gates of the second group; and means for applying the logical sum of the outputs of each pair of gates in each group to the second gates of all other pairs of gates in the same group, in a sense to enable the second gate in each group associated with the enabled first gate in the same group, and in a sense to disable the remaining $n-1$ second gates in each group.

6. In combination, $n$ pairs of gates, each pair comprising a first gate and a second gate, where $n$ is an integer, the logical sum of the outputs of one pair of gates representing a bit of one value and the logical sum of the outputs of all other pairs of gates representing the bit of other value;

means for applying an alternating signal to all first gates for priming all first gates during one portion of duration $\Delta t$ of each cycle and disabling all first gates during the remaining portion of each cycle;

means for applying the logical sum of the outputs of each pair of gates to all second gates, except the second gate of that pair, in a sense to enable the second gate of the pair of such gates the logical sum of whose outputs represent the bit of one value, and to disable the remaining second gates;

means for producing the complement of the logical sum of the outputs of each pair of gates; and means for delaying said complements an interval $\Delta t$ and applying the delayed complement of the logical sum of the output of each pair of gates except the last pair of said gates to the first gate of the succeeding pair of gates, and for applying the delayed complement of the logical sum of the outputs of the last pair of gates to the first gate of the first pair of gates.

7. In combination, $n$ pairs of gates, each pair comprising a first gate and a second gate, where $n$ is an integer, the logical sum of the outputs of one pair of gates representing a bit of one value and the logical sum of the outputs of all other pairs of gates representing the bit of other value;

means for obtaining signals indicative of said logical sums;

means for applying an alternating signal to all first gates for priming all first gates during one portion of each cycle and disabling all first gates during the remaining portion of each cycle; and means for applying the signals indicative of the logical sums of the outputs of each pair of gates to all second gates, except the second gate of that pair, in a sense to enable the second gate of the pair of such gates the logical sum of whose outputs represent the bit of one value, and to disable the remaining second gates.

References Cited by the Examiner

UNITED STATES PATENTS

| | | | |
|---|---|---|---|
| 3,047,738 | 7/1962 | Haas | 307—88.5 |
| 3,178,590 | 4/1965 | Heilweil et al. | 307—88.5 |

ARTHUR GAUSS, *Primary Examiner.*

J. S. HEYMAN, *Assistant Examiner.*